(12) United States Patent  
Witt et al.

(10) Patent No.: US 7,793,745 B2
(45) Date of Patent: Sep. 14, 2010

(54) IMPLEMENT WITH TANDEM TRANSMISSION

(75) Inventors: Brian J. Witt, Brillion, WI (US); Fredric D. Schreiner, Green Bay, WI (US)

(73) Assignee: Ariens Company, Brillon, WI (US)

( * ) Notice: Subject to any disclaimer, the term of this patent is extended or adjusted under 35 U.S.C. 154(b) by 247 days.

(21) Appl. No.: 12/017,788

(22) Filed: Jan. 22, 2008

(65) Prior Publication Data

US 2009/0183593 A1 Jul. 23, 2009

(51) Int. Cl.
*B62D 51/04* (2006.01)

(52) U.S. Cl. ...................... 180/19.3; 180/19.1; 180/19.2
(58) Field of Classification Search ................ 180/19.3, 180/19.1
See application file for complete search history.

(56) References Cited

U.S. PATENT DOCUMENTS

| 4,286,670 | A | * | 9/1981 | Ackerman | 172/42 |
|---|---|---|---|---|---|
| 4,558,558 | A | * | 12/1985 | Horner et al. | 56/11.3 |
| 4,809,796 | A | * | 3/1989 | Yamaoka et al. | 180/6.48 |
| RE33,131 | E | * | 12/1989 | Morrison | 298/1 H |
| 5,077,959 | A | * | 1/1992 | Wenzel | 56/11.1 |
| 5,127,215 | A | | 7/1992 | Wenzel | |
| 5,146,735 | A | | 9/1992 | McDonner | |
| 5,355,661 | A | * | 10/1994 | Tomiyama | 56/10.8 |
| 5,816,034 | A | | 10/1998 | Peter | |
| 5,822,961 | A | | 10/1998 | Busboom | |
| 6,082,083 | A | | 7/2000 | Staples et al. | |
| 6,126,564 | A | | 10/2000 | Inikura et al. | |
| 6,155,033 | A | * | 12/2000 | Wians et al. | 56/11.1 |
| 6,672,411 | B1 | | 1/2004 | Mouser | |
| 6,699,147 | B1 | | 3/2004 | Speece et al. | |
| 7,059,433 | B2 | | 6/2006 | Hasegawa et al. | |
| 7,063,177 | B1 | | 6/2006 | Crumly | |
| 2007/0144167 | A1 | | 6/2007 | Abend et al. | |

* cited by examiner

*Primary Examiner*—Lesley Morris
*Assistant Examiner*—Marlon A Arce
(74) *Attorney, Agent, or Firm*—Quarles & Brady LLP

(57) ABSTRACT

An implement with two independent transmissions drives a common output shaft. Each transmission is configured to rotatably drive the output shaft in a different direction to simplify changing the ground direction of the implement. Moreover, in a preferred embodiment, the transmissions are actuated by levers that provide infinitely variability of the implement's ground speed.

20 Claims, 4 Drawing Sheets

IMPLEMENT WITH TANDEM TRANSMISSION

CROSS REFERENCES TO RELATED APPLICATIONS

Not Applicable.

STATEMENT REGARDING FEDERALLY SPONSORED RESEARCH

Not Applicable

TECHNICAL FIELD

The present invention relates to the implements, and more particularly to a transmission assembly for propelling an implement over the ground.

DESCRIPTION OF THE BACKGROUND ART

Implements, such as lawn mowers and snow blowers, are typically powered by a prime mover, such as an internal combustion engine. The engine also includes a transmission driving ground engaging drive wheels that propel the implement in a forward and reverse direction. Changing direction or speed of the implement requires bringing the implement to a complete halt and operating a gear lever to change the ratio of the transmission, such that the implement moves in a different direction or at a different ground speed.

When the path of the implement encounters numerous obstacles, the operator must change the speed and/or direction of the implement numerous times severely impacting the operator efficiency. Moreover, the transmission typically has a fixed number of selectable gear ratios which limits the available ground speeds the implement can achieve. As a result, the operator cannot always tailor the ground speed of the implement to a desired ground speed appropriate for the operating conditions.

SUMMARY OF THE INVENTION

The present invention provides an implement with two independent transmissions driving a common output shaft. Each transmission is configured to rotatably drive the output shaft in a different direction to simplify changing the ground direction of the implement. Moreover, in a preferred embodiment, the transmissions are actuated by levers that provide infinitely variability of the implement's ground speed and provide an easy transition between forward and reverse directions.

The advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENTS

Figure 1:
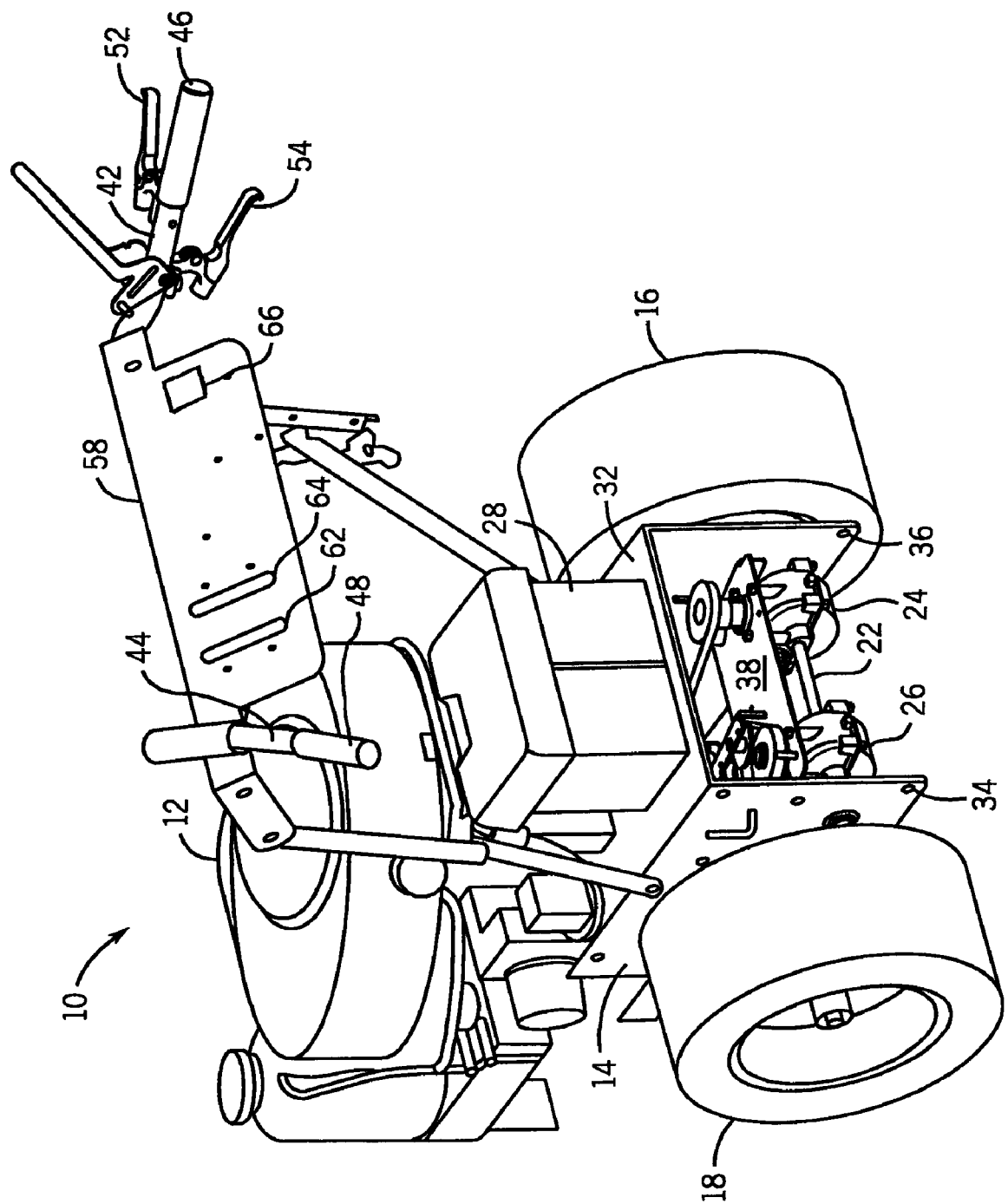
FIG. 1 is a rear left perspective view of an implement incorporating the present invention.

As shown in FIGS. 1-5, the implement 10 is powered by an internal combustion engine 12 mounted on a frame 14. The frame 14 is supported by a pair of ground engaging drive wheels 16, 18 driven by a transverse output shaft 22. The output shaft 22 is rotatably driven in one direction by a forward transmission 24 to propel the implement 10 in a forward direction A rearward transmission 26 rotatably drives the output shaft 22 in an opposite direction to propel the implement 10 in a rearward direction.

The frame 14 supports the engine 12, a battery 28 for starting the engine 12, and a working device (not shown), such as a lawn cutting mower deck, snow blowing blower, tiller, and the like. In the embodiment disclosed herein, the frame 14 includes an upper deck 32 supporting the battery 28 and engine 12. The drive wheels 16, 18 are rotatably mounted relative to a pair of substantially parallel side plates 34, 36 extending downwardly from opposing side edges of the upper deck 32. A transmission mounting bracket 38 extending between the side plates 34, 36 supports the forward and rearward transmissions 24, 26.

Right and left handlebars 42, 44 extending rearwardly from the frame 14 include grips 46, 48 for grasping by the operator to steer the implement 10. Forward and reverse control levers 52, 54 mounted proximal the grip 46 on the right handlebar 42 selectively engage an engine crankshaft 56 to the transmissions 24, 26 to operatively connect the engine 12, or prime mover, to the transmissions 24, 26. A control panel 58 extending between the handlebars 42, 44 includes openings 62, 64, 66 for mounting controls for controlling the working device.

In the preferred embodiment shown in FIGS. 1-5, the internal combustion engine 12 rotatably drives the vertical crankshaft 56, or prime mover output shaft, extending through the frame 14. The engine 12 is operatively connected to the drive wheels 16, 18, as described in more detail below, and preferably is selectively operatively connected to the working device. Although a vertical shaft internal combustion engine 12 is disclosed, the prime mover can be a horizontal shaft internal combustion engine having a horizontal crankshaft, an electric motor, and the like, without departing from the scope of the invention.

Figure 2:
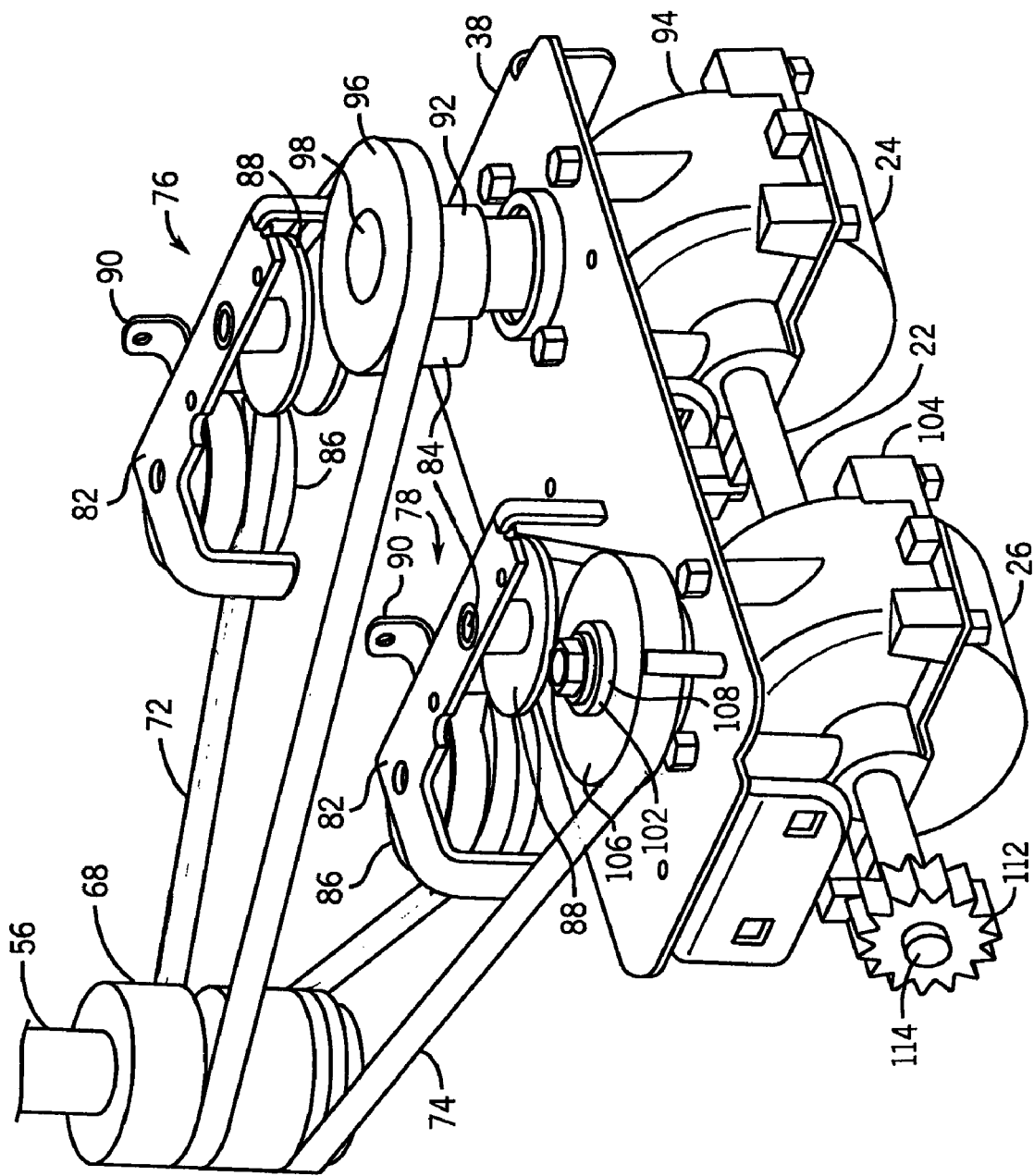
FIG. 2 is a rear left perspective view of the transmissions of FIG. 1.
Figure 3:
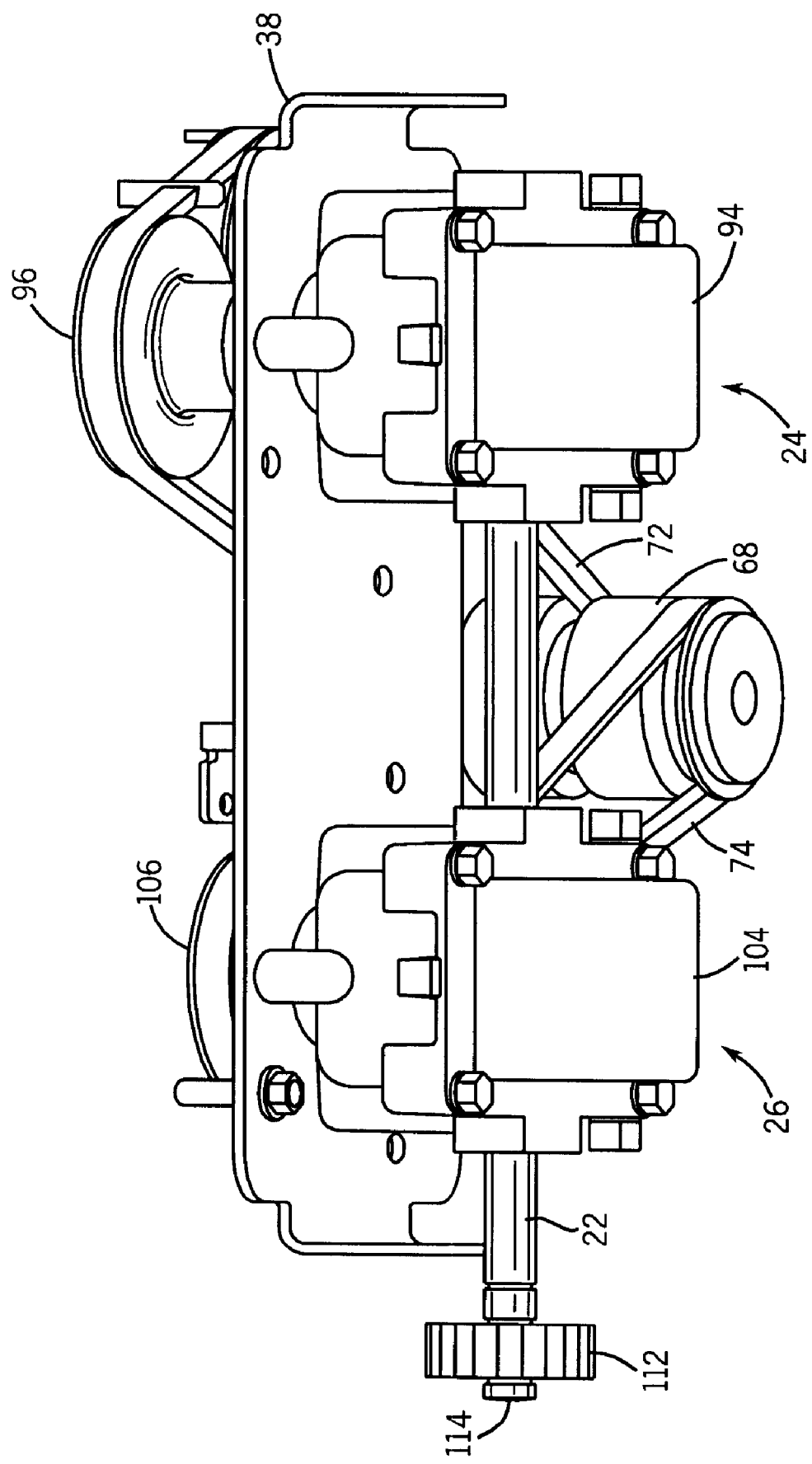
FIG. 3 is a bottom perspective view of the transmissions of FIG. 2.

As shown in FIGS. 2 and 3, a distal end of the vertical crankshaft 56 includes a drive sheave 68 engaging a forward transmission drive belt 72 and a rearward transmission drive belt 74. The forward transmission drive belt 72 transmits power from the crankshaft 56 to the forward transmission 24. Likewise, the rearward transmission drive belt 74 transmits power from the crankshaft 56 to the rearward transmission 26. Forward and reverse idler pulley assemblies 76, 78 control the transmission of power between the drive sheave 68 and the forward and rearward transmissions 24, 26.

Each idler pulley assembly 76, 78 includes an idler bracket 82 pivotally mounted on a pivot shaft 84 fixed to the transmission mounting bracket 38. A lead idler pulley 86 rotatably mounted on the bracket 82 guides the transmission drive belt 72, 74 over a trailing idler pulley 88 rotatably mounted on the pivot shaft 84. A tab 90 extending upwardly from the bracket 82 fixes an end of a spring that biases the idler pulley assembly 76, 78 toward an idling position in which the transmission drive belt 72, 74 ineffectively engages the drive sheave 68.

The forward transmission 24 is preferably a gear transmission having an input shaft 92 extending upwardly from a forward transmission housing 94 through the transmission mounting bracket 38. The input shaft 92 drives a gear set mounted in the housing 94. The gear set drives the output shaft 22 extending transversely through the housing 94. Preferably, a forward transmission sheave 96 mounted on the upper end 98 of the input shaft 92 engages the forward transmission belt 72.

The rearward transmission 26 is also preferably a gear transmission having an input shaft 102 extending upwardly from a rearward transmission housing 104 through the transmission mounting bracket 38. The input shaft 102 drives a gear set mounted in the housing 104. The gear set drives the output shaft 22 extending transversely through the housing 104. Preferably, a rearward transmission sheave 106 mounted on the upper end 108 of the input shaft 102 engages the rearward transmission belt 74.

The common transverse output shaft 22 extends through both transmission housings 94, 104. Advantageously, the forward transmission 24 drives the common output shaft 22 in one direction to propel the implement 10 in a forward direction, and the rearward transmission 26 rotatably drives the output shaft 22 in an opposite direction to propel the implement 10 in a rearward direction. A pinion gear 112 mounted on one end 114 of the output shaft 22 engages a differential transmission that drives both drive wheels 16, 18. Although one pinion gear is shown, a pinion gear can be provided on each end of the common output shaft to engage a transmission for each drive wheel.

Figure 4:
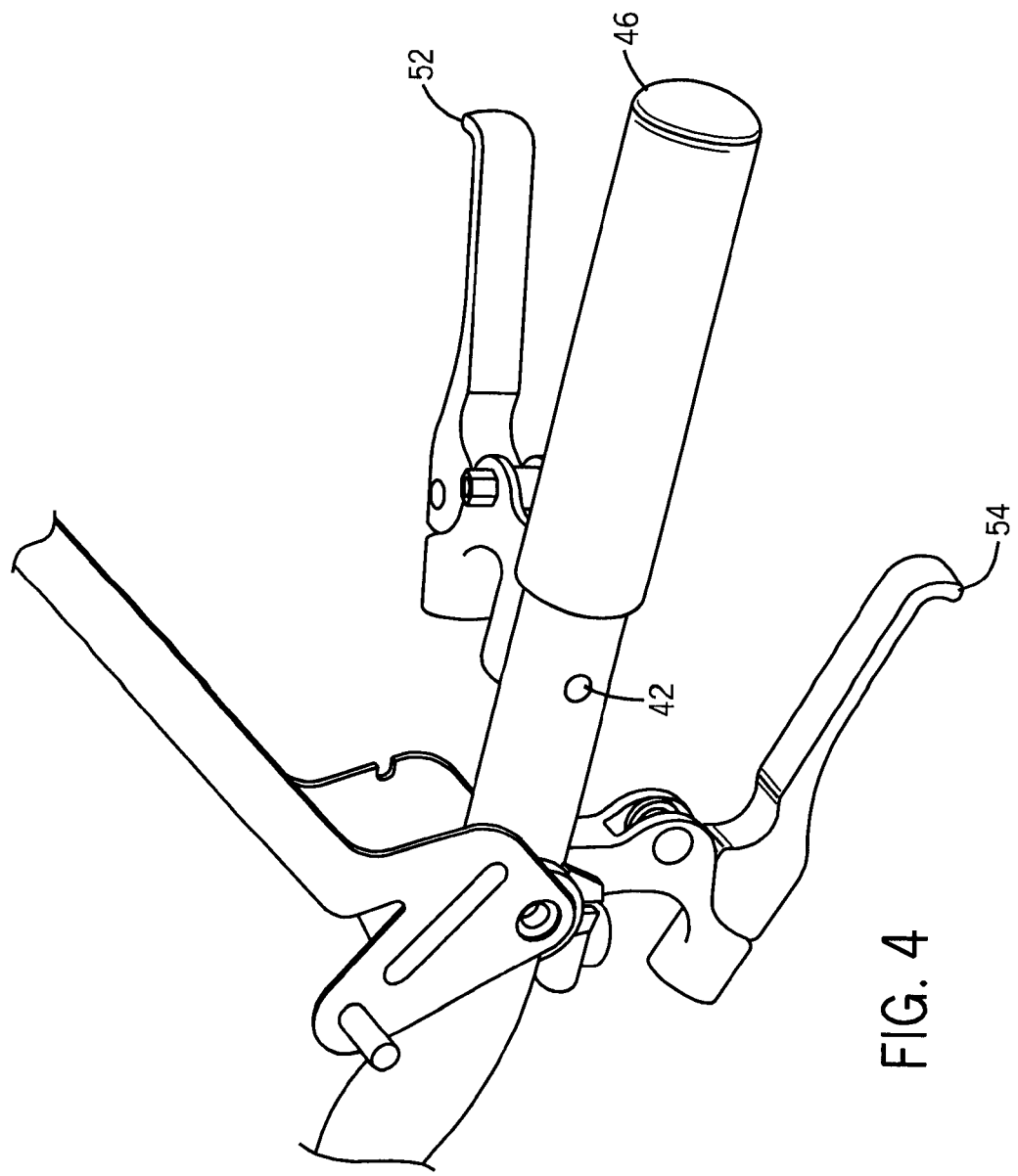
FIG. 4 is a detailed view of the right handlebar of FIG. 1.

The forward control lever 52 shown in FIG. 4 is connected to the forward idler pulley assembly 76 by a cable which moves the forward idler pulley assembly 76 between an engaged position and the idling position. In the engaged position, the forward idler pulley assembly 76 engages the forward transmission drive belt 72 to tighten the forward transmission drive belt 72 around the drive sheave 68 and forward transmission sheave 96 to transmit power from the engine 12 to the forward transmission 24.

The reverse control lever 54 also shown in FIG. 4 is connected to the reverse idler pulley assembly 78 by a cable which moves the reverse idler pulley assembly 78 between an engaged position and the idling position. In the engaged position, the reverse idler pulley assembly 78 engages the rearward transmission drive belt 74 to tighten the rearward transmission drive belt 74 around the drive sheave 68 and rearward transmission sheave 106 to transmit power from the engine 12 to the rearward transmission 26.

Figure 5:
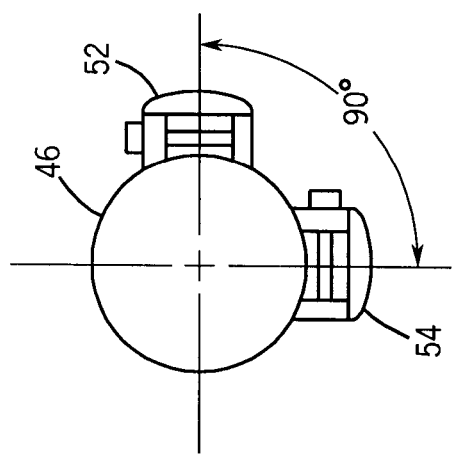
FIG. 5 is an end view of the right handlebar of FIG. 4.

As shown in FIGS. 4 and 5, the forward control lever 52 is preferably positioned relative to the reverse control lever 54 to discourage simultaneous operation of both levers 52, 54. In the embodiment disclosed herein, this is accomplished by mounting both levers 52, 54 proximal the right handlebar grip 46 for actuation by the operator's right hand. The levers 52, 54 are spaced about the right handlebar grip 46 in positions making it difficult to grasp both levers 52, 54 at the same time. As shown in FIG. 5, both levers 52, 54 are difficult to grasp using a single hand when the forward control lever 52 is positioned at least 90 degrees relative to the reverse control lever 54.

In use, the operator urges the forward control lever 52 toward the right handlebar grip 46 to pivot the forward idler pulley assembly 76 toward the engaged position and tighten the forward transmission drive belt 72 around the drive sheave 68 and forward transmission sheave 96. As the forward transmission drive belt 72 tightens around the sheaves 68, 96, the forward transmission drive belt 72 transmits power from the engine 12 to the forward transmission 24 to propel the implement 10 in the forward direction. The more the forward control lever 52 is displaced toward the right handlebar grip 46, the more efficiently power is transmitted from the engine 12 to the forward transmission 24 and the faster the implement 10 is propelled in the forward direction.

The implement 10 is reversed by releasing the forward control lever 52 and urging the reverse control lever 54 toward the right handlebar grip 46 to pivot the reverse idler pulley assembly 78 toward the engaged position and tighten the reverse transmission drive belt 74 around the drive sheave 68 and reverse transmission sheave 106. As the reverse transmission drive belt 74 tightens around the sheaves 68, 106, the reverse transmission drive belt 74 transmits power from the engine 12 to the reverse transmission 26 to propel the implement 10 in the reverse direction. As described above with respect to the forward control lever 52, the more the reverse control lever 54 is displaced toward the right handlebar grip 46, the more efficiently power is transmitted from the engine 12 to the reverse transmission 26 and the faster the implement 10 is propelled in the reverse direction.

Advantageously, the lever actuated tandem transmission described above provides an implement ground speed that can infinitely vary between a complete stop to a maximum speed so that an operator can tailor the ground speed to a desired ground speed appropriate for the operating conditions. This infinite variability is accomplished by varying the displacement of the particular control lever engaging the desired transmission with the crankshaft. Moreover, the preferred lever arrangement allows an operator to reverse direction of the implement by changing the operator's hand position on the handlebar grip by releasing one of the forward and reverse control levers and actuating the other of the forward and reverse control levers without stopping the implement or removing the operator's hands from the implement.

While there has been shown and described what is at present considered the preferred embodiment of the invention, it will be obvious to those skilled in the art that various changes and modifications can be made therein without departing from the scope of the invention defined by the appended claims. For example, the forward and reverse lever arrangement can be used with a single transmission capable of selectively propelling the implement in the forward and reverse directions.

We claim:

1. An implement comprising:
    a prime mover including a rotatably driven prime mover output shaft;
    a first transmission operatively connected to said prime mover output shaft;
    a second transmission operatively connected to said prime mover output shaft; and
    an output shaft rotatably driven in one direction by said first transmission and in an opposite direction by said second transmission.

2. The implement as in claim 1, in which at least one of said first transmission and said second transmission is operatively connected to said prime mover output shaft by a drive belt.

3. The implement as in claim 1, in which at least one of said first transmission and said second transmission is a mechanical transmission.

4. The implement as in claim 1, including an actuatable first lever, wherein actuation of said first lever operatively connects said first transmission to said prime mover output shaft.

5. The implement as in claim 4, including an actuatable second lever, wherein actuation of said second lever operatively connects said second transmission to said prime mover output shaft.

6. The implement as in claim 5, wherein said first lever and said second lever are mounted on said implement, and said first lever is positioned relative to said second lever to discourage simultaneous actuation of said first lever and said second lever.

7. The implement as in claim 6, including a first handlebar and a second handlebar extending from a frame supporting said prime mover, said first lever and said second lever being mounted on one of said first handlebar and said second handlebar.

8. The implement as in claim 7, in which said first lever and said second lever are spaced about a grip on said one of said first handlebar and said second handlebar, with said first lever being positioned at least 90 degrees relative to the second lever.

9. The implement as in claim 1, in which said prime mover is an internal combustion engine, and said prime mover output shaft is a crankshaft.

10. The implement as in claim 1, in which said prime mover output shaft is operatively connected to a working device.

11. An implement comprising:
a frame;
a prime mover supported by said frame and operatively connected to at least one transmission selectively propelling said implement in a forward direction and a reverse direction;
a first handlebar extending from said frame;
a second handlebar extending from said frame;
an actuatable first lever mounted on said first handlebar, wherein actuation of said first lever engages said at least one transmission to propel said implement in a forward direction; and
an actuatable second lever mounted on said first handlebar, wherein actuation of said second lever engages said at least one transmission to propel said implement in a reverse direction, said first lever being positioned relative to said second lever to discourage simultaneous actuation of said first lever and said second lever.

12. The implement as in claim 11, in which said prime mover includes a prime mover output shaft, and including a first transmission operatively connected to said prime mover output shaft, a second transmission operatively connected to said prime mover output shaft, and an output shaft rotatably driven in one direction by said first transmission and in an opposite direction by said second transmission.

13. The implement as in claim 12, in which at least one of said first transmission and said second transmission is operatively connected to said prime mover output shaft by a drive belt.

14. The implement as in claim 12, in which at least one of said first transmission and said second transmission is a mechanical transmission.

15. The implement as in claim 11, in which said prime mover is an internal combustion engine, and said prime mover output shaft is a crankshaft.

16. The implement as in claim 11, in which said prime mover output shaft is operatively connected to a working device.

17. The implement as in claim 11, in which said first lever and said second lever are spaced about a grip on said first handlebar, with said first lever being positioned at least 90 degrees relative to the second lever.

18. An implement comprising:
a frame;
a prime mover supported by said frame and including a rotatably driven prime mover output shaft;
first transmission operatively connected to said prime mover output shaft;
a second transmission operatively connected to said prime mover output shaft;
an output shaft rotatably driven in one direction by said first transmission and in an opposite direction by said second transmission;
a first handlebar extending from said frame;
a second handlebar extending from said frame;
an actuatable first lever mounted on one of said first handlebar and said second handlebar, wherein actuation of said first lever engages said first transmission to propel said implement in said one direction; and
an actuatable second lever mounted on said one of said first handlebar and said second handlebar, wherein actuation of said second lever engages said second transmission to propel said implement in said opposite direction, said first lever being positioned relative to said second lever to discourage simultaneous actuation of said first lever and said second lever.

19. The implement as in claim 18, in which said first lever and said second lever are spaced about a grip on said one of said first handlebar and said second handlebar, with said first lever being positioned at least 90 degrees relative to the second lever.

20. The implement as in claim 18, in which at least one of said first transmission and said second transmission is operatively connected to said prime mover output shaft by a drive belt.

* * * * *